Nov. 29, 1966   A. W. KOON   3,288,916
MULTIPLE CONDUCTOR CABLE WITH TUBULAR FOAM FILLER INSULATION
Filed July 28, 1964
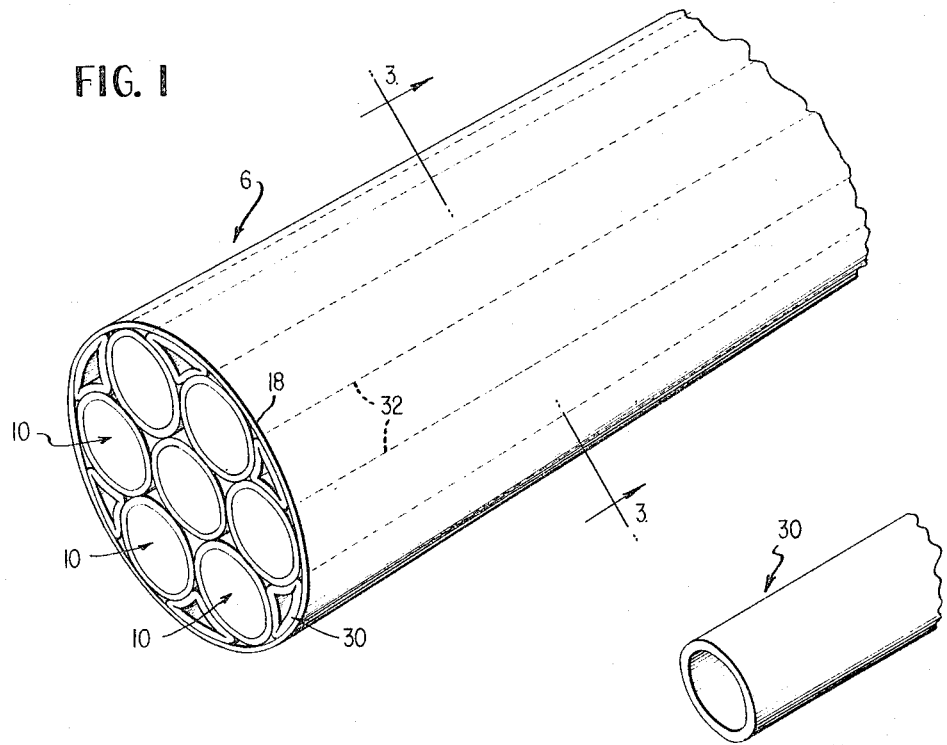
FIG. 1
FIG. 3
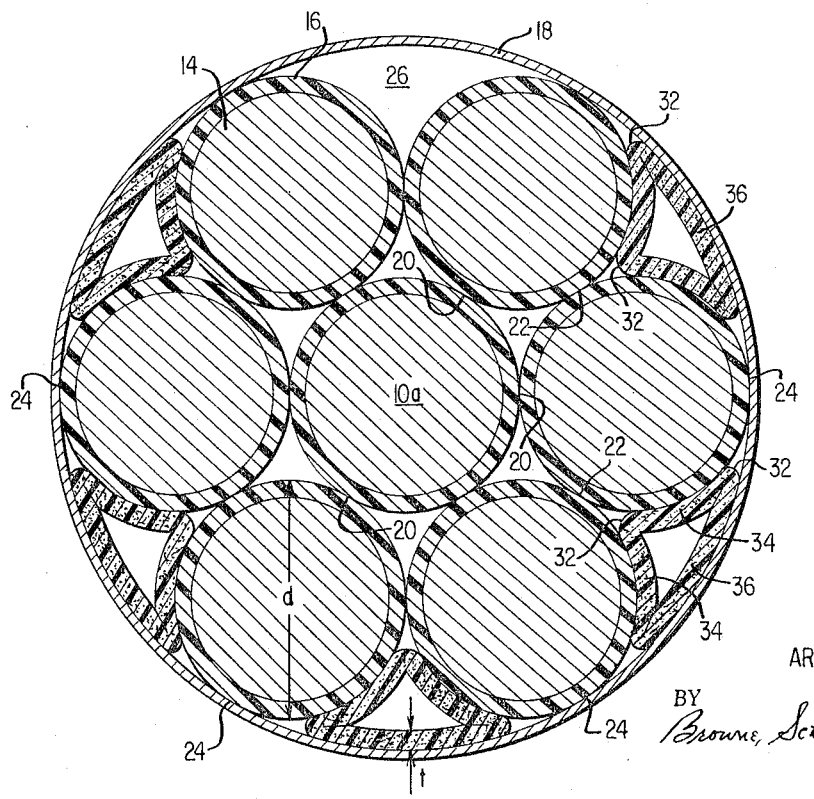
FIG. 2
INVENTOR.
ARCHIE W. KOON
BY
*Browne, Schuyler & Beveridge*
ATTORNEYS.

United States Patent Office 3,288,916
Patented Nov. 29, 1966

3,288,916
MULTIPLE CONDUCTOR CABLE WITH TUBULAR
FOAM FILLER INSULATION
Archie W. Koon, Auburn, N.Y., assignor to Columbian
Rope Company, Auburn, N.Y., a corporation of New
York
Filed July 28, 1964, Ser. No. 385,600
4 Claims. (Cl. 174—116)

This invention generally relates to conductor cables and more particularly to a conductor cable having an improved filler construction.

Conventional conductor cables generally include fillers interposed between adjacent strands of conductors for imparting dimensional support to the cable while maintaining it in a desired uniform shape throughout the full length of the cable. These fillers also have the purpose of preventing relative movement between the conductors and consequent chaffing of their outer insulating material. In some cables, the fillers further serve as a barrier to water or moisture that has penetrated into the cable, for example, through a tear in the protective sheath of the cable.

In the past these fillers have been made from flexible strands formed with a solid cross-section from one or more of a wide variety of materials including textile fibers, paper, rubber, and plastic. Although such fillers may exhibit certain desirable qualities for achieving one or more of the stated purposes, they possess certain undesirable qualities which are believed to render them unsatisfactory, commercially. For example, fillers of extruded rubber or soft plastic have the advantage of being readily deformable into the voids between conductors during fabrication but their softness often renders them incapable of maintaining the desired contour and results in a virtually structureless product. Moreover, conventional fillers of extruded rubber and soft plastic are relatively heavy and expensive.

Other plastics of greater structural strength such as foam plastic have been employed in filler constructions to impart the desired support and contour to the cable. However, these stronger fillers because of their conventional solid cross-section do not deform easily into the voids between conductors and as a result are susceptible to rupture by excessive forces required to so deform the fillers. Furthermore, it is difficult to deform these stronger fillers to provide a uniform cable shape throughout the full length of the cable.

Accordingly, it is an object of the present invention to provide an improved cable filler which is relatively soft and light in weight while being readily deformable between conductors where it will firmly lodge the conductors against movement and yet will impart adequate support to the cable throughout its entire length.

A further object of the present invention is to provide an improved cable filler which in fabrication may be easily deformed without rupture, into contour engagement with conductors and conformity with the external contour of the cable so as to additionally provide a cable having a smooth and uniform external contour throughout.

A still further object of the present invention is to provide an improved cable filler which will achieve the above objects and yet is economical to manufacture and incorporate into cables.

Other objects of the present invention will become apparent from the following description taken in conjunction with the accompanying drawings in which:

FIG. 1 is a fragmental perspective view of a conductor cable incorporating fillers embodying the present invention;

FIG. 2 is an enlarged cross-sectional view taken generally along lines 2—2 of FIG. 1, with one of the fillers removed; and FIG. 3 is a fragmental perspective view of one of the fillers before it is inserted into the cable.

Referring now to the drawings in detail, there is shown for illustrative purposes an electrical conductor cable generally designated 6 of cylindrical shape, including a plurality of conductors 10 also of cylindrical shape. Conductors 10 may be of any suitable construction such as includes a metallic wire core 14 covered by insulating material 16 as shown in FIG. 2. Encasing and sealing conductors 10 throughout their full length is a tubular sheath 18 formed from any suitable material such as rubber or plastic.

In the illustrated embodiment there are seven conductors 10, six of which are equi-angularly spaced around a central conductor 10a in engagement with the central conductor 10a at points 20 and with each other at points 22. Referring to FIG. 2, sheath 18 is dimensioned to engage all the conductors at surface areas 24 so as to define elongated cavities or voids 26 extending throughout the cable between each pair of adjacent conductors 10.

In accordance with the present invention, cavities 26 are filled by elongate tubular fillers generally designated 30, formed from a foam plastic such as foamed polyethylene, polystyrene, polyurethane, rubber or a polyvinyl chloride compound. Prior to insertion in cable 6, fillers 30 have a hollow cylindrical shape shown in FIG. 3 and a length sufficient to extend throughout the longitudinal dimension of cavities 26.

In constructing the cable, fillers 30 are inserted into cavities 26 and then pressed or wedged inwardly to cause folding of the filler about lines 32 into a three sided figure having two equal concave sides 34 which engage and conform to the periphery of conductors 10 and a third convex side 36 to be engaged by the inner surface of sheath 18 also in contour fashion. It will be appreciated that in folding about lines 32, substantial compressive deformation of the fillers 30 capable of rupturing the filler tissue is avoided. This folding about lines 32, which occurs uniformly throughout the filler, is achieved by virtue of the tubular foam plastic construction. After all of the fillers 30 are inserted between the respective conductors, sheath 18 is applied to complete the cable.

In the preferred embodiment fillers 30 are dimensioned so that the three sides 34, 36 of each filler are virtually in full contact with adjacent conductors 10 and sheath 18 respectively as shown in FIG. 3. Moreover, in a seven conductor cable such as that illustrated, it is preferred that the cross-sectional area of the filler be approximately equal to 80% of the cross-sectional area of void 26 and the perimeter dimension of the filler be approximately equal to 80% of the perimeter dimension of void 26. In this manner optimum characteristics of flexibility, dimensional support, retension of the conductors and ease of deformation of the fillers during assembly are obtained. These characteristics are met in a seven conductor cable by a filler having an outside diameter approximately equal to $.935d$ and a wall thickness designated $t$ approximately equal to $.176d^2$ where $d$ is the outside diameter of one of the conductors as illustrated in FIG. 2.

It will thus be evident that with the fillers of the present invention, the conductors are all positively retained against relative movement and a smooth cylindrical contour of the cable is obtained as well as adequate dimensional strength without unduly diminishing the overall flexibility of the cable.

Although the present invention has been described and illustrated in connection with a cylindrical cable having seven circularly arranged conductors, it will be appreciated that the fillers of the present invention may be employed to equal advantage in connection with cables of other shapes and conductor arrangements and with a greater or lesser number of conductors.

Moreover, as will be apparent to persons skilled in the art, various other modifications and adaptations of the structure illustrated and described above will become readily apparent without departure from the spirit and scope of the invention which is defined in the appended claims.

What is claimed is:

1. A conductor cable comprising a number of elongate conductors, a tubular sheath enclosing and engaging the conductors and defining therewith a number of elongate cavities, and a number of elongate tubular fillers of foam plastic received in the cavities, each filler having two concave walls in contour engagement with an associated pair of conductors and a convex third wall in contour engagement with the inner surface of said sheath, said convex and concave walls having a total cross-sectional area equal to approximately 80% of the cross-sectional area of one cavity.

2. The conductor cable as defined in claim 1 wherein the distance of the outer periphery of one filler is equal to approximately 80% of the peripheral distance of one cavity.

3. A conductor cable comprising a number of elongate conductors, a tubular sheath enclosing and engaging the conductors and defining therewith a number of elongate cavities, and a number of entirely non-conducting elongate tubular fillers received in the cavities, each filler having a one-piece construction formed of lightweight self-supporting and easily deformable material and including two concave walls in contour engagement with an associated pair of conductors and a convex third wall in contour engagement with the inner surface of said sheath, said convex and concave walls of each filler having a total cross-sectional area equal to approximately 80% of the cross-sectional area of one cavity and with the outer peripheral distance of each filler being equal to approximately 80% of the peripheral distance of one cavity.

4. The conductor cable defined in claim 3 including six of said fillers each having a wall thickness approximately equal to $.176d^2$ where $d$ is the outside diameter of one of the conductors.

References Cited by the Examiner

UNITED STATES PATENTS

| 1,132,452 | 1/1914 | Davis | 174—116 |
| 1,955,692 | 4/1934 | Thomas | 174—13 |

FOREIGN PATENTS 1,124,181  10/1956  France.

LARAMIE E. ASKIN, *Primary Examiner.*

JOHN F. BURNS, LEWIS H. MYERS, *Examiners.*

H. HUBERFELD, *Assistant Examiner.*